(12) United States Patent
Stephens et al.

(10) Patent No.: US 7,620,647 B2
(45) Date of Patent: Nov. 17, 2009

(54) HIERARCHY GLOBAL MANAGEMENT SYSTEM AND USER INTERFACE

(75) Inventors: Sean Stephens, Crystal Lake, IL (US); James B. Cushman, II, Alpharetta, GA (US); Joaquim Neto, San Rafael, CA (US); Michael Scotece, Glendale, AZ (US); Bradley Scott Jacobs, Stone Mountain, GA (US)

(73) Assignee: Initiate Systems, Inc., Chicago, IL (US)

( * ) Notice: Subject to any disclaimer, the term of this patent is extended or adjusted under 35 U.S.C. 154(b) by 0 days.

(21) Appl. No.: 11/901,040

(22) Filed: Sep. 14, 2007
(Under 37 CFR 1.47)

(65) Prior Publication Data

US 2008/0235249 A1    Sep. 25, 2008

Related U.S. Application Data

(60) Provisional application No. 60/845,072, filed on Sep. 15, 2006.

(51) Int. Cl.
*G06F 17/00* (2006.01)

(52) U.S. Cl. ............................... 707/101; 707/2; 707/5

(58) Field of Classification Search ................ 707/100, 707/101, 2, 5; 715/764
See application file for complete search history.

(56) References Cited

U.S. PATENT DOCUMENTS

| 5,497,486 | A | 3/1996 | Stolfo et al. |
| 5,991,758 | A | 11/1999 | Ellard |
| 2002/0095421 | A1 * | 7/2002 | Koskas ........................ 707/100 |
| 2002/0178360 | A1 * | 11/2002 | Wenocur et al. ............. 713/170 |
| 2007/0055647 | A1 * | 3/2007 | Mullins et al. .................. 707/2 |
| 2007/0094060 | A1 * | 4/2007 | Apps et al. ...................... 705/7 |
| 2007/0192715 | A1 * | 8/2007 | Kataria et al. ................ 715/764 |
| 2008/0120432 | A1 * | 5/2008 | Lamoureux et al. ......... 709/238 |

OTHER PUBLICATIONS

Merriam-Webster dictionary defines "member" as "individuals".*
C. C. (Kelly) Gotlieb, Oral interviews with C. C. Gotlieb, Apr. 1992, May 1992, ACM, pp. 1-72.*
IEEE, no match results, Jun. 30, 2009, p. 1.*
Goggle.com, no match results, Jun. 30, 2009, p. 1.*
Fair, "Record Linkage in the National Dose Registry of Canada", European Journal of Cancer, 33:S37-S43, XP005058648 ISSN: 0959-8049, Apr. 1997.
Waddington, D., "Does it signal convergence of operational and analytic MDM?" retrieved from the Internet: <URL: http://www.intelligententerprise.com>, 2 pages, Sep. 5, 2007.
International Search Report mailed on Oct. 10, 2008, for PCT Application No. PCT/US07/20311 (10 pp.).

* cited by examiner

*Primary Examiner*—Yicun Wu
*Assistant Examiner*—Donald Lawson
(74) *Attorney, Agent, or Firm*—Sprinkle IP Law Group

(57) ABSTRACT

Embodiments disclosed herein provide data management systems with an ability to integrate parent-child and peer-to-peer relationships (e.g., hierarchies) in a single interface, allowing a user to parent/unparent, link/unlink, merge/unmerge, and modify trusted attributes in a single interaction using highly accurate algorithms to provide data, including hints and recommendations for the management of these hierarchies. A user interface allows a user to perform hierarchy global management functions including read, write, business-to-business (B2B) search, navigation, and maintenance.

20 Claims, 9 Drawing Sheets

*FIG. 5A*

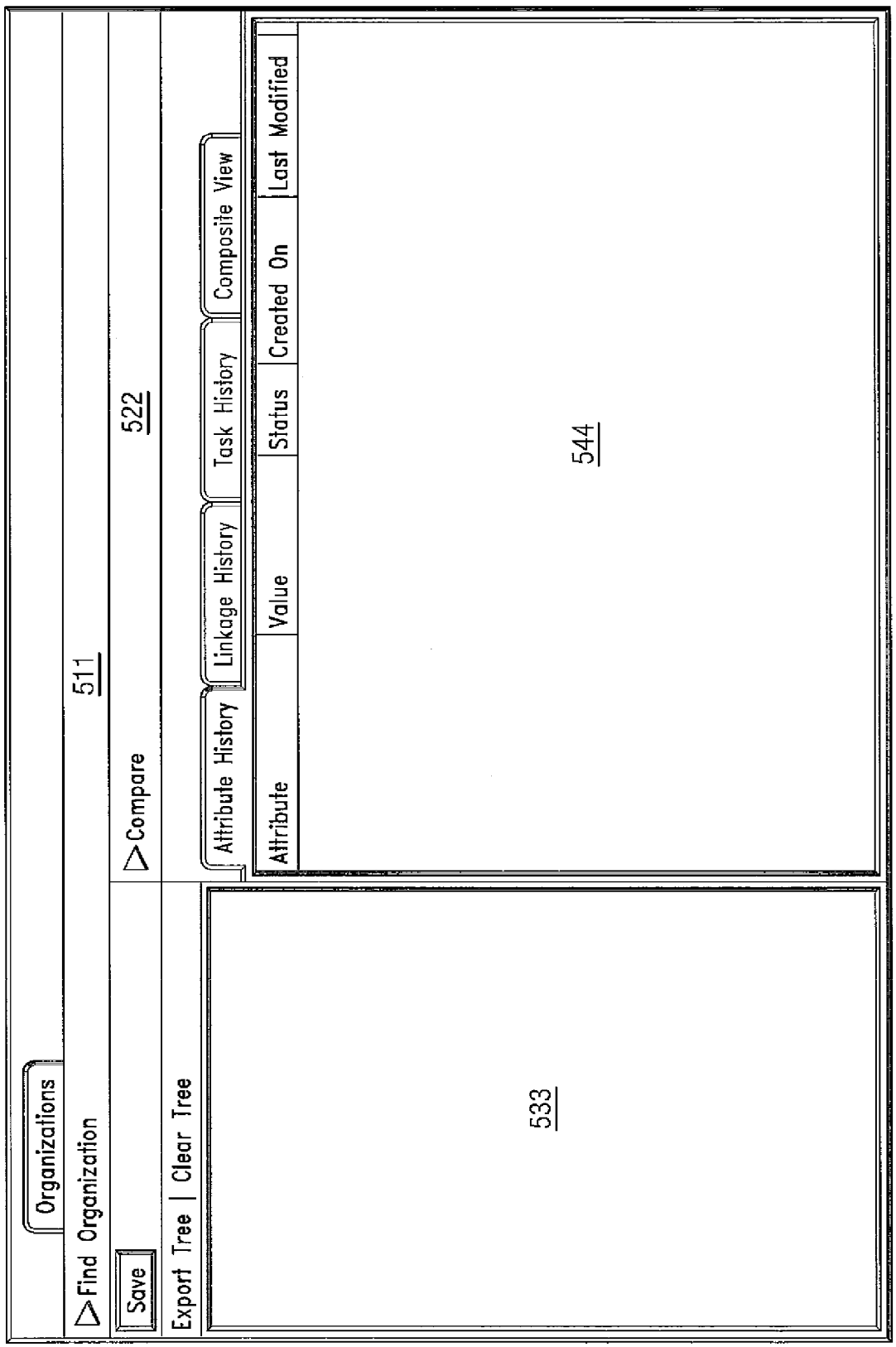

511a

| Record # | Source ID | Score | Name | City | State/Province |
|---|---|---|---|---|---|
| | | | | | |

Results (showing 1–6 of 6)  |< << Page 1 of 1 >> >|  Show XXX Per Page

Display As: [Entire Tree] [Path To Root] [Rooted Tree]

*FIG. 7*

| Attribute History | Composite View | Linkage History | Comparison |

INFUS:901788950

| Attribute ▽ | Value | Status | Created On | Last Modified |
|---|---|---|---|---|
| Primary SIC (8) | Code: 573401 | A | 1969-12-31 17:00:00 | 1969-12-31 17:00:00 |
| Phone | 312-759-5030 | A | 1969-12-31 17:00:00 | 1969-12-31 17:00:00 |
| Name | INITIATE SYSTEMS INC | A | 1969-12-31 17:00:00 | 1969-12-31 17:00:00 |
| Modeled Employment Size | A | A | 1969-12-31 17:00:00 | 1969-12-31 17:00:00 |
| Local Sales | Amount: 000005430 Range: E | A | 1969-12-31 17:00:00 | 1969-12-31 17:00:00 |
| Local Employee Information | Emp Coun: 00015 Range: C | A | 1969-12-31 17:00:00 | 1969-12-31 17:00:00 |
| Hierarchy Category | Cat: 9 Ent: Y | A | 1969-12-31 17:00:00 | 1969-12-31 17:00:00 |
| Asset range | S | A | 1969-12-31 17:00:00 | 1969-12-31 17:00:00 |
| Address (Location) | 200 W MADISON ST #2300 CHICAGO, IL USA 60606-3414 | A | 1969-12-31 17:00:00 | 1969-12-31 17:00:00 |

HIERARCHY GLOBAL MANAGEMENT SYSTEM AND USER INTERFACE

CROSS-REFERENCE TO RELATED APPLICATIONS

This application claims priority from U.S. Provisional Application No. 60/845,072, filed Sep. 15, 2006, entitled "METHOD AND SYSTEM FOR A USER INTERFACE FOR MANIPULATION OF DATA RECORDS IN A HIERARCHICAL MANNER," which is fully incorporated by reference herein.

TECHNICAL FIELD

This disclosure relates generally to data management and more particularly to Master Data Management (MDM) for hierarchical relationships. Even more particularly, embodiments disclosed herein relate to global organization and management of hierarchies in the areas of customer data integration.

BACKGROUND

To run a business and meet increasingly demanding international standards, such as Sarbanes-Oxley and International Accounting Standards (IAS) 2005, multi-site and international organizations (i.e., parent or global entities) must get a consolidated view of information (e.g., financial data) from their subsidiaries, member or local organizations, or the like. At the same time, each member organization may have to answer to national and/or local governmental standards and reporting requirements. These diverse business intelligence, analytic, and reporting needs and requirements often result in an inefficient and error-prone workflow. For example, subsidiaries must take financial information out of their local systems and reenter it into a spreadsheet or system provided by their parent organization. In addition, this workflow must be repeated by each subsidiary before the parent company can consolidate it into one financial report.

Several options exist on the market today that can be used to create and perhaps manage relationships between individuals and organizations. Some prior data management systems have the ability to allow a user to create many-to-many relationships as well as hierarchical relationships via custom user interfaces. However, these prior user interfaces may be limited in terms of supplying hints and visual representations as to the nature of the organization hierarchy in question and more often require textual references to make associations and/or disassociations. Furthermore, modern and legacy solutions may interact directly with a single type of database only. Moreover, they often offer limited services and protection to users to prevent them from inadvertently creating invalid relationships in relation to other stored relationships (e.g., circular, child has two parents in the same tree, etc.). Consequently, there is always room for improvement in the field of data management.

SUMMARY OF THE DISCLOSURE

Embodiments disclosed herein can provide systems and methods that can eliminate or reduce the disadvantages of previously developed data management systems and methods. More particularly, embodiments disclosed herein provide data management systems with an ability to integrate parent-child and peer-to-peer relationships (e.g., hierarchies) in a single interface, allowing a user to parent/unparent, link/unlink, merge/unmerge, and modify trusted attributes in a single interaction using highly accurate algorithms to provide data, including hints and recommendations for the management of these hierarchies.

Some embodiments disclosed herein can leverage an embodiment of a master data management system and method for indexing information about entities with respect to hierarchies, as disclosed in U.S. patent application Ser. No. 11/656,111, filed Jan. 22, 2007, which is incorporated herein by reference and which may be capable of rationalizing an almost unlimited number of asserted hierarchies into a single, trusted hierarchy using probabilistic algorithms. To that extent, some embodiments disclosed herein are capable of retrieving, viewing, and manipulating an unlimited number of hierarchies and records using drag-and-drop visual mechanisms as well as performing numerous manipulations to multiple records and trees in the hierarchies before committing the manipulated records and/or trees to one or more data repositories.

Some embodiments disclosed herein may be platform and technology agnostic. Some embodiments disclosed herein may be deployed as a thin client. One embodiment may be deployed using Ajax. Some embodiments may apply Group Permissions at the point of entry, which greatly improves the user experience and is highly efficient. Some embodiments disclosed herein allow users to retrieve individual records, build an entire tree from a selected record, or return just the path from selected record to the rooted (top most) record in the hierarchy. In this way, users can receive clear visuals when any record in tree has unresolved work task or rule associated therewith and can work tasks by account or task type through a workflow management disclosed herein.

With embodiments disclosed herein, users can quickly and efficiently identify records (e.g., customers, businesses, suppliers, etc.) using advanced fuzzy search techniques where returned values are sorted in order of likelihood. In some embodiments, users may select an individual record or they may build the current tree around the selected record. In some embodiments, users can navigate up and down through a hierarchy using visual semantics as well as navigate within a single node at any point in the tree. In some embodiments, users can link or merge, unlink or unmerge, parent or unparent, and modify record attributes from a single console using drag and drop visual reference. With embodiments disclosed herein, users can accomplish more work in less time with greater, more accurate results.

Embodiments disclosed herein may provide a number of distinct advantages over the prior art, including the ability for linking and associating hierarchies of data to more facilitate the disambiguation of a virtually unlimited number of hierarchies (e.g. creating, reading, updating, deleting, associating, disassociating, etc. records kept in one or more hierarchies or hierarchical formats) through the use of visual queues which designate whether or not links have been established between hierarchies or subhierarchies, the ability to present data regarding how a link was established and unique interface features such as the ability to use single inputs to access hierarchies or subhierarchies, the ability to build out trees of the hierarchies a single layer at a time or multiple layers simultaneously and the ability to use drag and drop interface tools. Embodiments disclosed herein may integrate powerful searching techniques for navigating through hierarchies or different subhierarchies of linked hierarchies and the ability to export data related to one or more hierarchies to a file, where this information may be in a specific format. For example, data may be exported to a file in a format configured to be read by a spreadsheet application (e.g., Microsoft®

Excel). Another technical advantage of embodiments disclosed herein may be the ability to allow rules pertaining to the data records of the hierarchies or the hierarchies themselves to be instantiated.

Other features, advantages, and objects of the disclosure will be better appreciated and understood when considered in conjunction with the following description and the accompanying drawings.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIGS. 5-12 are screenshots of an exemplary user interface implementing one embodiment of a data management system.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Preferred embodiments of the present invention and the various features and advantageous details thereof are explained more fully with reference to the examples illustrated in the accompanying drawings where like numerals are used to refer to like and corresponding parts or elements. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Figure 1:
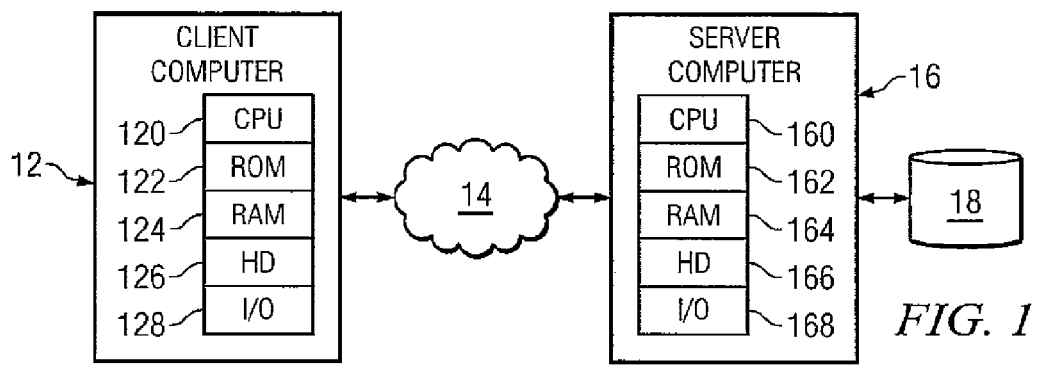
FIG. 1 depicts a simplified schematic representation of one embodiment of a computer network which includes a client computer and a server computer.

FIG. 1 illustrates an exemplary network architecture in which embodiments disclosed herein may be implemented. The architecture includes a client computer 12 that is bi-directionally coupled to a network 14, and a server computer 16 that is bi-directionally coupled to the network 14 and a database 18. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O devices 128 can include a keyboard, monitor, printer, electronic pointing device (e.g., mouse, trackball, etc.), or the like. The server computer 16 can include a CPU 160, ROM 162, RAM 164, HD 166, and I/O 168.

Each of the client computer 12 and the server computer 16 is an example of a data processing system. ROM 122 and 162, RAM 124 and 164, HD 126 and 166, and the database 18 include media that can be read by the CPU 120 or 160. Therefore, each of these types of memories includes a data processing system readable medium. Within this disclosure, the term "data processing system readable medium" is used interchangeably with the term "computer-readable storage medium." These memories may be internal or external to computers 12 and 16.

Figure 2:
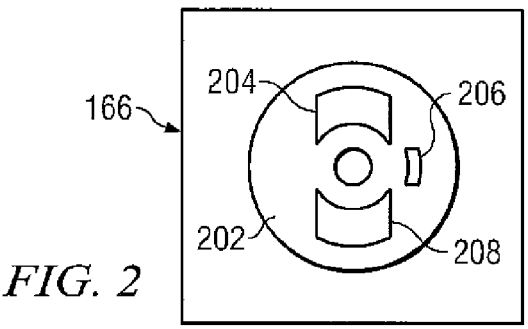
FIG. 2 depicts a simplified schematic representation of one embodiment of a computer readable storage medium carrying computer-executable instructions.

Embodiments of a data management system described herein may be implemented in suitable software code that may reside within ROM 122 or 162, RAM 124 or 164, or HD 126 or 166. In addition to those types of memories, some instructions implementing embodiments disclosed herein may be contained on a data storage device with a different data processing system readable storage medium, such as a floppy diskette. FIG. 2 illustrates a combination of software code elements 204, 206, and 208 that are embodied within a data processing system readable medium 202, on a HD 166. Alternatively, the instructions may be stored as software code elements on a DASD array, magnetic tape, floppy diskette, optical storage device, or other appropriate data processing system readable medium or storage device.

In an illustrative embodiment, the computer-executable instructions may be lines of compiled C++, Java, or other language code. Other computer architectures may be used. For example, the functions of the client computer 12 may be incorporated into the server computer 16, and vice versa. Further, other client computers (not shown) or other server computers (not shown) similar to client computer 12 and server computer 16, respectively, may also be connected to the network 14.

Communications between the client computer 12 and the server computer 16 can be accomplished using electronic, optical, radio frequency, or other signals. When a user is at the client computer 12, the client computer 12 may convert the signals to a human understandable form when sending a communication to the user and may convert input from a human to appropriate electronic, optical, radio frequency, or other signals to be used by the client computer 12 or the server computer 16.

Figure 3:
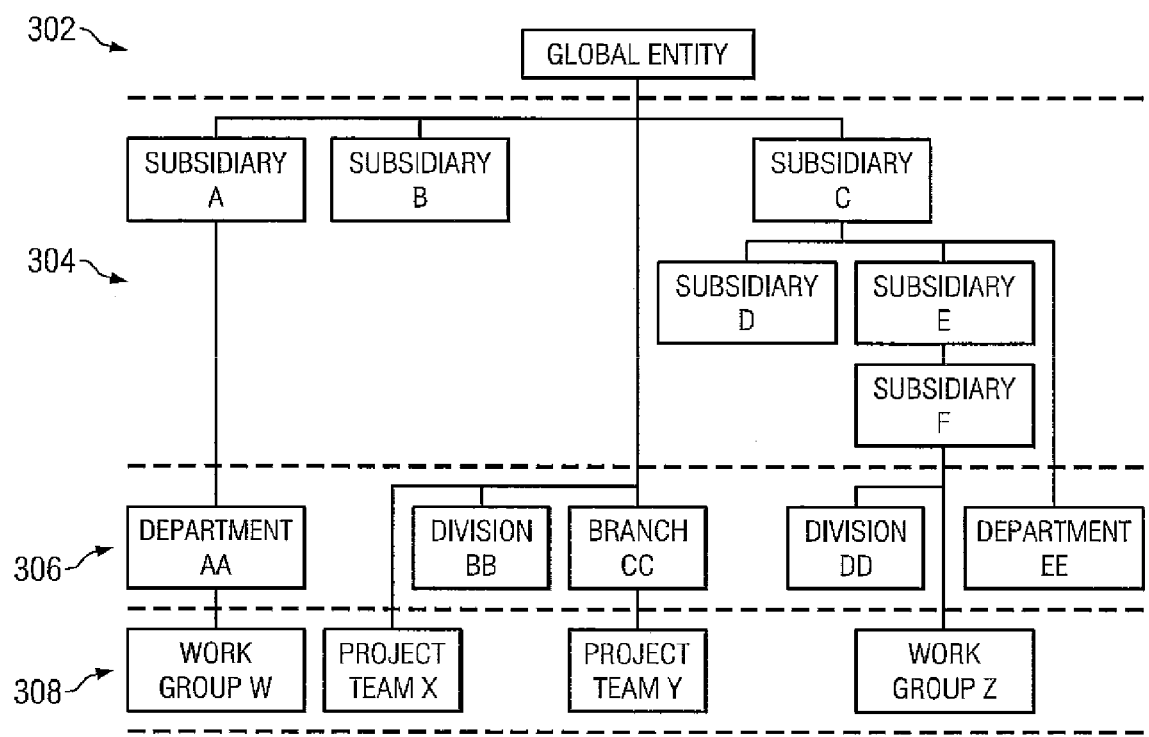
FIG. 3 depicts a schematic representation of an exemplary organization hierarchy.

FIG. 3 depicts an exemplary organization hierarchy. Some embodiments disclosed herein can be particularly applicable to a system and method for indexing information from multiple information sources about companies to an explicit business hierarchy such as Dun and Bradstreet (D&B), Experian, or Equifax. It is in this context that the exemplary embodiments will be described. It will be appreciated, however, that the data management system and method disclosed herein has utility in a large number of applications that involve identifying, associating, and structuring into hierarchy information about entities.

As FIG. 3 illustrates, a global entity may be organized hierarchically. Below top level 302, there may be a plurality of business units (e.g., subsidiaries) at level 304. At level 306, there may be engagement centers (e.g., departments, divisions, branch locations, etc.). At level 308, there may be smaller groups of individuals (e.g., work groups, sub-departments, project teams, etc.). As one skilled in the art can appreciate, other organization hierarchies, including more complex ones, are possible. For example, a global entity may be involved with other global entity or entities through some kind of business relationship(s) (e.g., partners, joint ventures, suppliers, customers, venders, prospects, etc.). Each entity may have its own organization hierarchy. As another example, an organization in a hierarchy may break away and becomes a separate, recognizable global entity having its own organization hierarchy. Such dynamic, mutable relationships can mean significant challenges in managing complex data of individuals and organizations within a global entity and/or across business entities.

As described above, some prior data management systems have the ability to allow a user to create and perhaps manage hierarchical relationships between data. However, these prior systems often offer limited services and protection to users to prevent them from inadvertently creating invalid relationships in relation to other stored relationships (e.g., circular, child has two parents in the same tree, etc.). The limited capability of prior data management systems is exemplified by the limited functionality provided through their user interfaces. A user often does not have sufficient information, including hints and visual representations, as to the nature of the hierarchy in question. Explicit textual references are often required to make associations and/or disassociations (i.e., there are no "maybe's"). Furthermore, prior data management systems may only allow interaction with a single source of data, leaving out other data sources (e.g., a third party data repository) which may have more creditable, detailed, and/or accurate information.

To address the weaknesses and limitations of prior data management systems, embodiments of a data management system described herein provide a read-write, business-to-business (B2B) search, navigation, and maintenance tool ("Hierarchy Global Manager" or HGM) that focuses on establishing accurate, timely, and complete view(s) of organizations and hierarchy management and supports multi-lingual character encoding (e.g., supports 8-bit Unicode Transformation Format (UTF-8)) in a single visual context. In some cases, such multi-lingual support would be necessary to support a global installation of a data management system for a multi-national business entity or organization. In some embodiments, a computer (e.g., a server computer) may be particularly programmed to implement the data management system. Some embodiments of the data management system may be implemented as a deployable thin client. In some embodiments, software components of the data management system may comprise computer executable instructions residing on one or more computer readable media accessible and executable by computer(s) in a network environment as described above with reference to FIGS. 1 and 2. As an example, a user may select a link to one embodiment of a data management system on a browser application or provide a specific URL address to the browser application running on client computer 12. In response, the browser application may submit a request over network 14 to access one embodiment of a data management system residing on server computer 16.

Figure 4:
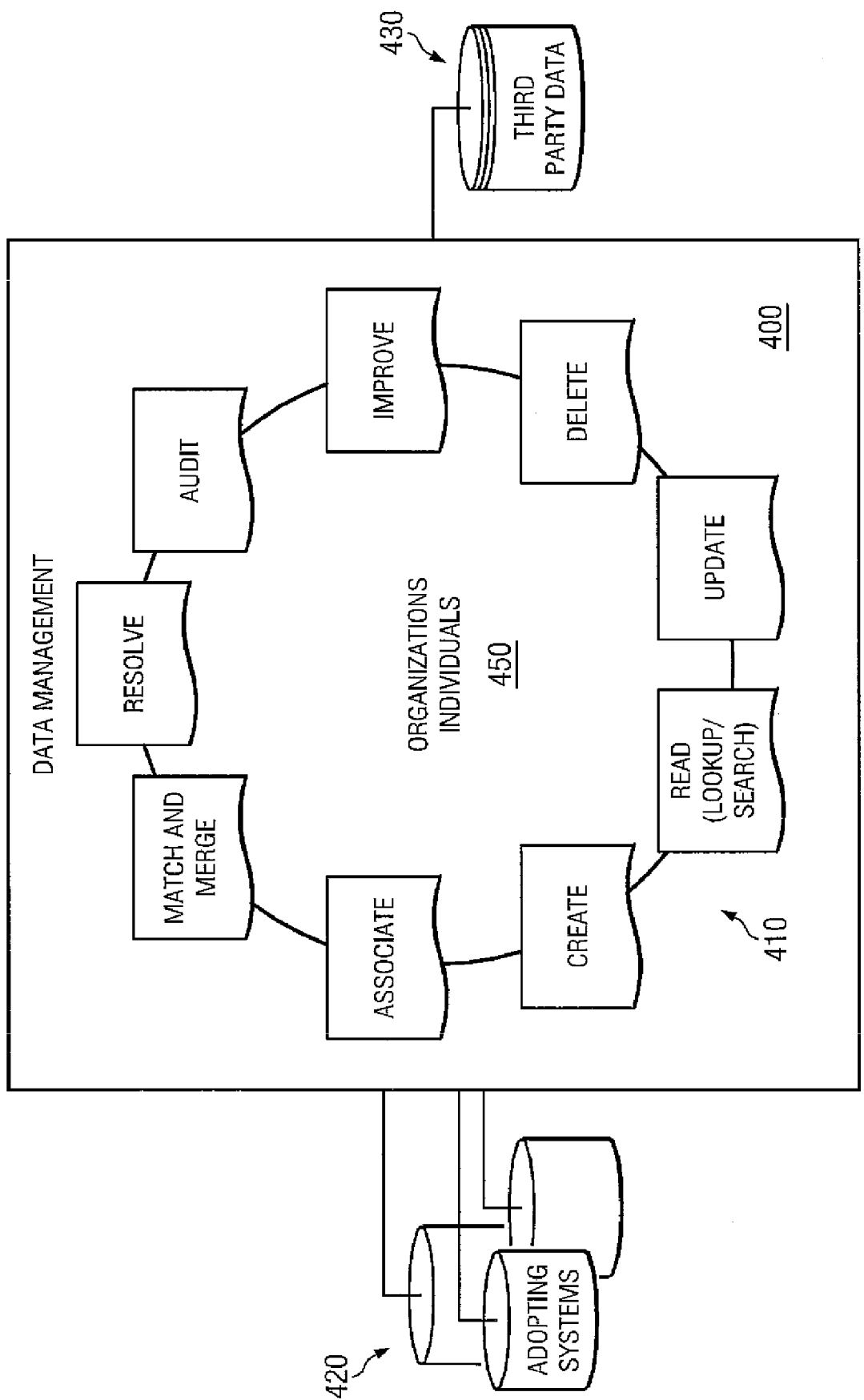
FIG. 4 depicts a simplified schematic representation of one embodiment of a data management system.

FIG. 4 depicts a simplified schematic representation of one embodiment of HGM 400 having a plurality of hierarchy management functions (e.g., services 410) including match and merge, resolve, audit, improve, delete, update, read (lookup and search), create, and associate. The functionality of HGM 400 is accessible through an intuitive, user-friendly interface. For example, a user at a system which adopts HGM 400 (e.g., adopting systems 420) can utilize services 410 to lookup before create, read, update, and/or delete indexed master records 450 of organizations and individuals. To that extent, in one embodiment, HGM 400 can be seen as a services platform for adopting systems 420. In one embodiment, organizations and individuals 450 comprise Microsoft Individuals and Organization (MIO) source records (referred to herein as MIO 450). According to embodiments disclosed herein, HGM 400 is not simply a data warehouse or a reporting platform. In one embodiment, HGM 400 is an organization and individual mastering platform where common information about organizations and individuals 450 is shared with adopting systems 420. In one embodiment, HGM 400 provides data stewardship tools for managing data and data quality. In one embodiment, HGM 400 is communicatively coupled to external data sources (e.g., third party source 430). In one embodiment, HGM 400 can seamlessly integrate data from various sources to provide a single, consistent source of information within a business entity for its complex data on organizations and individuals. For example, if a selected organization has multiple data sources (e.g., D&B, MSO, and InfoUSA), a user can select the data sources individually and view the organization detail from each particular data source via HGM 400's user interface.

Embodiments of HGM 400 support the following functional areas through its interface:

Find Organizations—Search for an organization using name, address, and/or phone number and return a list of matching candidates. Alternately, instead of searching using demographics, users may retrieve members using a known identifier (e.g., a MIO ID) and the record's Source. Each MIO ID is guaranteed to be unique, so no Source is required, just the MIO ID. For other Identifiers, they are only unique within a Source so a user would need to supply the Identifier as well as the Source. For either Search mechanism, a user can indicate how much of the organization's hierarchy to return by selecting a Retrieve as: Node Only, Entire Tree, Path to Root, or Rooted Tree. Also included are conditional search filters that limit the Source(s) that each user may Search or Retrieve Organizations from. Search/Retrieve is the starting point for most user activities in HGM. This function returns a list of organization(s). The user is to select the "best" organization from the returned list and choose how the tree is to be built correspondingly.

Organization Management—Maintain an organization node by updating the attribute values on the MIO Source record. In one embodiment, Organization Management has the ability to export a view of that organization as a field delimited (e.g., tab, pipe, comma, or other reliable separators) file for importation into other media such as a spreadsheet application (e.g., Excel), HTML, RDBMS, or the like. In some embodiments, users may have additional options as to how much or little of tree they wish to export (e.g., Node Only, Entire Tree, Path to Root, Rooted Tree, etc.) In one embodiment, Organization Management includes functions referred to herein as Data Change Review and Delete Review functions. In one embodiment, Data Change Review enables a user to review a change in an attribute value before deciding whether to make the change manually. Just as parenting may change in a delta file, external sources often provide updates to attribute values. These changes can be automatically processed via delta processing. However, if a user designates a MIO attribute as "Protected", those attributes will not be automatically overwritten during delta processing. Instead, the delta process creates "Attribute Update Protected" tasks that users can review before deciding whether to make the change manually. In one embodiment, Delete Review enables a user to make a decision on an instruction from a third party source to delete a member Organization. When external sources indicate that a member is deleted, users can see "Member Deleted" tasks that allow them to decide whether to honor the delete instructions from the third party source or keep the Organization active. A sanity check may be performed to avoid deleting a node that has at least one direct descendent.

Hierarchy Management—Move organizations within or across existing hierarchies, or break-out an organization into its own tree. In one embodiment, Hierarchy Management includes functions referred to herein as Linkage Task Review and Hierarchy Task Review functions. In one embodiment, Linkage Task Review enables a user to view linkage details between members of a hierarchy. More specifically, Linkage Task Review enables a user to review the member linkage results for members that matched into an account hierarchy as a soft linkage (lower score match) or those that matched as a hard linkage (higher score match) but did not match to one precise node (single tree or multiple tree matches). As part of the linkage review workflow, or at other ad-hoc times, Linkage Task Review can provide users with the ability to view the comparison score detail between any two members to help them evaluate their relationship. In one embodiment, Hierarchy Task Review provides users with the ability to review parenting change instructions and make appropriate decisions. During periodic (e.g., monthly) delta file processing, organizations can receive updates that provide parenting change instructions. In one embodiment, these parent changes are not automatically applied during the delta process. Instead, "Potential Parent Change" tasks are created to allow users to decide whether to make the parenting change or not.

FIGS. 5-12 are screenshots of exemplary master record management user interface 500 supporting the above-described functional areas of HGM 400. Interface 500 allows a user to perform hierarchy management functions on master records (e.g., MIO records) including read, write, and perform business-to-business (B2B) search, navigation, and maintenance with a consolidated view of integrated data from various sources in real time. Examples of hierarchy management functions will now be described in greater detail with reference to FIGS. 5-12.

Navigation

Figure 5A:
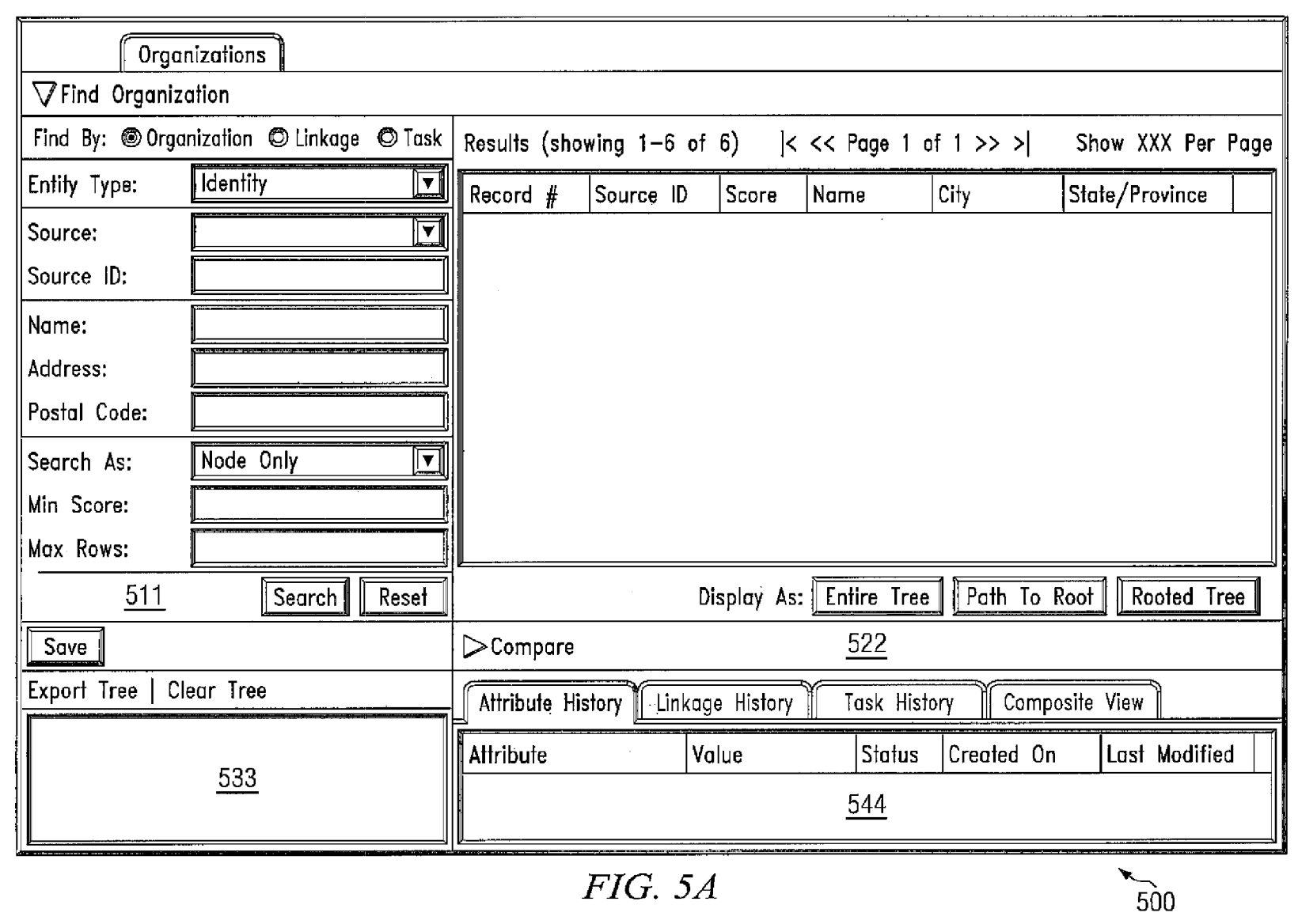

In one embodiment, HGM 400 is implemented as a web application that users can access via a specific http address. The specific http address may direct a browser to a login page of HGM 400. A user may log into HGM 400 by entering a valid user name and password, or by using single sign-on capabilities where no user name is required. After logging in, the user is then presented with a starting page. FIG. 5 shows a screenshot of an exemplary starting page of interface 500 after a user logs in.

In some embodiments, the functions of HGM 400 are organized into panes (e.g., Panes 511, 522, 533, 544) on interface 500. A user can open, close, or resize each pane as needed to optimize the workspace for the tasks that the user is performing at the time. Each pane provides certain features that are relevant to the data displayed in that pane, making those features intuitive and easy to find. In the example shown in FIG. 5, Find Organization Pane 511 is open and Compare Pane 522 is closed. Both panes can be opened and closed as needed. The Organization area (lower half of screen) is the primary workspace and has two panes: Hierarchy Tree Pane 533 and Organization Details Pane 544, the border of which can be resized by a user depending on the data displayed and activity the user is performing.

As an example of Pane Navigation, FIG. 5 shows a screenshot of interface 500 with Find Organization Pane 511 and Compare Pane 522 closed, maximizing the workspace for Hierarchy Tree Pane 533 and Organization Details Pane 544. A user might choose this setting after finding and selecting a particular organization tree and no longer needs to use the Search function.

Below describes each Pane in more detail in the context of the work that users will perform. From a Navigation perspective, a user can select from several different tabs within Organization Details Pane 544 to access different underlying functions. For example, Attribute History Tab may list current and historical (inactive) attribute values and provide a user with the ability to change those values (see e.g., FIGS. 9-10). Linkage History Tab may list current and historical linkage assignments, such as SoftLinkSNode or HardLinkSTree. Task History Tab may list current organization management tasks such as "Attribute Update Protected" or "Member Delete" (see e.g., FIG. 11) Note that completed tasks are not retained in this view. Auditing of completed tasks is accessible directly from the Attribute History Tab. Composite View Tab may display a composite view of a node within the account hierarchy, which is identical to the master data record (e.g., an MIO record from MIO 450) at that node. Composite View Tab may provide additional functionality dictated by alternate composite view rules.

The Logout function is not shown in FIGS. 4 and 5, but is accessible via a link on interface 500 (e.g., the upper right corner of a screen) if an embodiment of HGM 400 is not configured for single sign-on. If an embodiment of HGM 400 is configured for single sign on, a user may logout by closing the browser or navigating to another web page. If the user returns to HGM 400 using that same browser, HGM 400 will start a new session. In one embodiment, in progress work is not saved.

Find Organizations

Figures 6, 8:
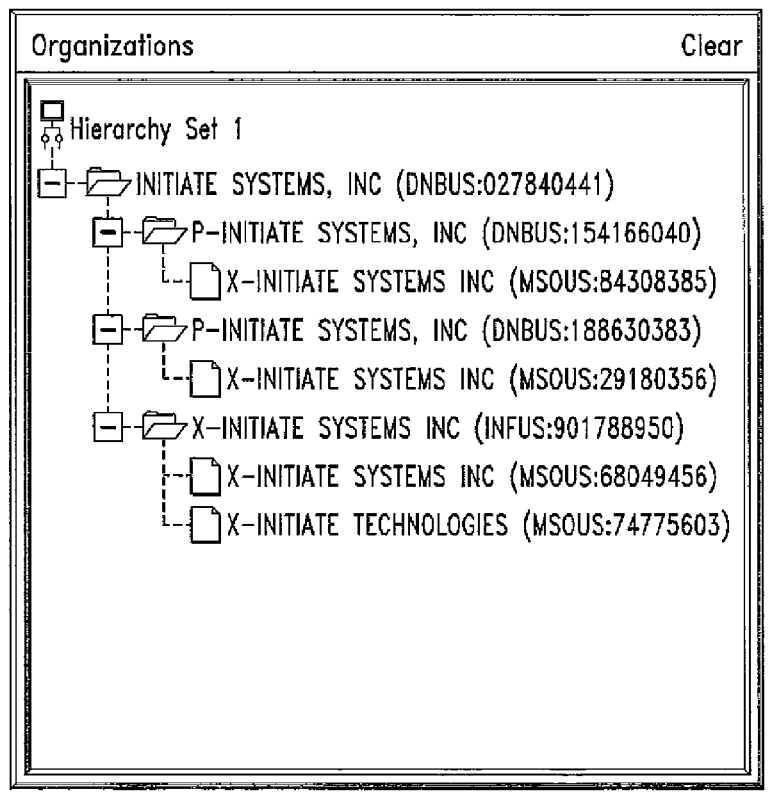

The starting point for nearly all user activities in HGM 400 is to find an Organization or Organizations of interest. The goal could be to find a specific organization or tree. Or, it could be to find any Organization that has a particular type of task associated with it. In any of those cases, a user can use Find Organization Pane 511 to search for an organization, a linkage, or a task. FIG. 6 shows a screenshot of an exemplary Find Organization Pane 511. In one embodiment, Find Organization Pane 511 can reconfigures itself depending on a "Find By" value selected by a user. For example, for Find By Organization, HGM 400 may operate to search for an any organization whose demographics meet the search criteria (e.g., Name, Address, Postal Code, etc.). For Find By Linkage, HGM 400 may operate to search for only those organizations that have a particular linkage task associated with them (e.g., HardLinkMTree). For Find By Taks, HGM 400 may operate to search for only those organizations that have a particular data management task associated with them (e.g., Member Delete). Exemplary Find By methods are further described below.

Find By Organization

If the Source ID (e.g., an MIO ID or "memrecno") for the desired organization is known, it may be retrieved directly by the Source ID, bypassing Initiate's probabilistic search. In addition, it can be retrieved using the Source ID and Source if a specific ID for a non-MIO Source is known. Alternately, search can be done via demographics such as Name, Street Address, Postal Code, and Phone (not shown).

In one embodiment, when a user searches for an organization, one of the following Search As methods may be specified:

Search As Member may display all Candidate records that match a user's search criteria.

Search As Node Only may display only one result for each Node returned by the Search function. For members that are returned by the Search function, HGM 400 may operate to display a composite view (or the MIO Source record) for each unique Nodes. This enables users to see one record per node in the Search results instead of seeing repeat rows for Candidate records that are part of the same Node. Note that with this Search type, the results displayed could look slightly different than the input criteria since the composite view (or MIO record) can have different attributes than the input Search criteria.

Search As Root may display only Root (i.e., the ultimate parent or global entity) members in the Search Results list. HGM 400 may operate to display only members that are Root members of a tree. This ensures that only one search result is displayed for an entire tree. If the search criteria does not match any Root members then the user will not see results for that tree. In one embodiment, HGM 400 does not search for a member and then navigate its tree to display the Root member, since that Root member could have entirely different attributes than the search criteria.

In one embodiment, two additional parameters are available for Search in HGM 400. Min Score and Max Rows. Both are optional and can be used to limit the results returned for a particular search. The Min Score parameter specifies the minimum score that a member's attributes must meet when compared to the search criteria in order for that member to be displayed in the search result. The Max Rows parameter specifies the maximum number of members that the user wants returned from the search. If more members were identified, those will not be returned to the results summary display. As an example, this can be done via a sub-function that controls how many numbers are to be displayed per page (e.g., "Show Per Page (NUMBER)").

Find By Task

This functionality allows a user to find tasks. Since tasks are generated against individual candidate records, Find By Task always searches "As Member". The following criteria listed in Table 1 can be utilized to prioritize search results:

TABLE 1

| Criteria | Description |
| --- | --- |
| Task Type | Examples: Potential Overlay, Attribute Update Protected, Member Delete, Parenting Change, etc. |
| Workflow Status | Statuses that indicate in-progress status points. Note that when the user selects a "Resolved" Workflow Status the task is deleted. |
| Owner | User name for the last user to update the workflow status |
| From Date | Start date for the range in which the task was created |
| To Date | End date for the range in which the task was created |
| Min Score | For tasks that have scores associated with them, results can be narrowed down by score. This applies only to SoftLink and HardLink tasks. |
| Max Rows | The number of tasks a user wants returned from the search |
| Source | Limits to tasks on members from a specific Source (e.g., DNBUS or MIODE). |
| Customer Segment | The value for the Custseg attribute, which indicates the customer segment |
| Customer Sub-segment | The value for the Custsubseg attribute, which indicates the customer sub-segment |

If a user wishes to find tasks for a specific Organization, he/she can simply use Find Organization Pane 511 to find that Organization and load it into Hierarchy Pane 533 (see e.g., FIG. 8). From there, the user can see the tasks associated with that specific Organization.

Conditional Search/Get Filter

In one embodiment, HGM 400 may support conditional security based upon where a user sits in the process flow. For example, when performing a Search or Get via Find Organization Pane 511, users may be restricted to a group of subsidiaries (e.g., companies having a principle business address in the United States) in the hierarchy. However, if the user selects an Organization (or Organization Candidate) that belongs to a hierarchy consisting of organizations from other subsidiaries, one embodiment of HGM 400 may operate to present these organizations as well. To accommodate this, conditional search and filtering logic can be utilized and dynamically applied when a user submits a Search or Get request, further refining what search results will be returned based on Group Permissions. In some embodiments, administrators can create a Source Restriction list for each user such that, upon Authentication, client processing will have a precise list of what sources a user can read (i.e., Search and/or Get).

Since users can Get (Retrieve) Trees that contain source records that a user may not be authorized to update (i.e., write), HGM 400 may operate to indicate which MIO Source records are outside of the users allowable edit list and prevents the user from making updates to those Organizations. In some embodiments, visual queue(s) may be used to indicate the user's access privilege of each record (e.g., red means read-only and black means read-write, etc.).

In one embodiment, Find Organization Pane 511 may be configured with optional visual indicators to indicate which fields apply for bucketing vs. comparison or which are required vs. optional. In one embodiment, Find Organization Pane 511 is configured with a sub-pane (e.g., Search Results Pane 511a) for displaying search results.

FIG. 7 shows a screenshot of exemplary Search Results Pane 511a where Organizations returned from a search can be displayed in a list, including the internal Record # (e.g., memrecno), the Source and Source ID, the Score with which the record matched the input criteria, and any demographics that a user chooses to display (e.g., Name, City, State/Province, etc.). In one embodiment, if there are more records that can be viewed on the page, a user can page (via a paging logic of HGM 400) next and prior to see additional records. When an organization of interest is identified, it is loaded into the organization workspace by highlighting that row and choosing one of the following display types buttons:

The Entire Tree button loads the entire tree into Hierarchy Tree Pane 533;

The Path to Root button loads a selected member and all of its parents up to the root;

The Rooted Tree button loads a selected member and all of its children to the bottom of the tree; and The Node button (not shown) loads a selected member and any member residing at that node. Note that with this selection, parenting operations cannot be exercised.

If a user wishes to load another tree, he/she can simply select another organization from the Search Results and click a desired display type button again. Alternately, the user can conduct a new search and follow the same process to load an entirely different tree. Double-clicking on an organization in the results list causes that organization to load using a default display type (e.g., Entire Tree).

After loading an organization(s) of interest, the user can close Find Organization Pane 511 (e.g., by simply clicking on the Find Organizations Pane icon) to hide that functionality until it is needed again. If loaded organization(s) is no longer needed, a user can simply clear the tree display (e.g., by clicking on Clear Tree in Pane 533) and start a new search for organizations. If a user wants to clear just a single hierarchy set from the tree displayed and leave the other(s) in place, the user can right click on the hierarchy set and select "Clear" (see e.g., FIG. 8).

Organization Management

After one or more organizations or trees are selected, Hierarchy Tree Pane 533 can be utilized to navigate among organizations. FIG. 8 shows a screenshot of exemplary Hierarchy Tree Pane 533 displaying Hierarchy Set 1, which can be seen as a tree having two types of objects: composite nodes represented by folder icons and individual candidates represented by file icons. A folder icon indicates that the node has at least two candidate records that are linked together. Each member of a hierarchy is a node having a master record of that member and zero to any number of candidate records that are linked to said member. A node is declared composite when at least two candidate records are linked together. In one embodiment of MIO 450, nearly all nodes are shown as folders since they contain a MIO source record and another record that was the basis for that MIO record. A folder icon indicates an individual candidate record. In the example of FIG. 8, the Hierarchy Set 1 tree shows the following relationships: parent and identify. A user can collapse or expand each node to show or hide the candidate records in the node. When a candidate in the tree is selected, Organization Details Pane 544 may show detailed information related to that organization, including its specific attribute values.

Figure 10:
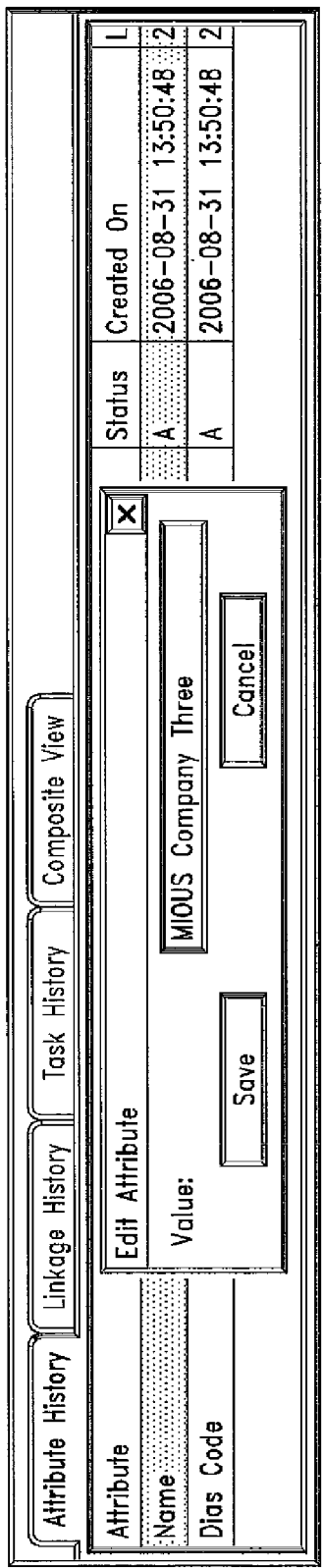

In one embodiment, Attribute History Tab of Organization Details Pane 544 has the following features: scrollable name-value pair attribute listings (see e.g., FIG. 9) and write capabilities and protection (see e.g., FIG. 10). More specifically, for all attributes that a user chooses, the current and historical (Inactive) values for those attributes can be displayed. If there are more attributes than can be displayed in a single screen, a user can scroll down to view the other attributes. In one embodiment, predefined grouping and sort orders can be utilized to arrange the attributes in a logical way. Additionally, filters with drop down lists (not shown) may allow a user to select one or more groups and one or more statuses so as to limit the display to a smaller number of attributes/attribute values. For example, if a user has defined a group named Sales that includes sales related attributes, the user could select Sales in a Group filter and Active in a Status filter to display only the current sales information for the Organization. Note that users may apply filters during each session and that the default display is to show all values. FIG. 9 shows a screenshot of exemplary Attribute History Tab 544a in which only current (active) name-value pair attribute listings are displayed.

FIG. 10 shows a screenshot of exemplary Edit Attribute window 544b which allows a user to add or edit attribute values for certain specified sources (e.g., MIO or MIO Managed Account (MNG) Sources). To update an attribute, a user can simply double-click on that attribute to open Edit Attribute window 544b and enter a new value. In the example of FIG. 10, a new organization name value "MIOUS Company Three" is entered for attribute Name. When the user click on the Save button, HGM 400 operates to versions the previous record and makes the new value the most current one. The versioned attribute can be seen, usually listed with an inactive status "I" (assuming the attribute is configured to have only one active value at a time).

In some embodiments, only records from MIO and MNG sources are editable by a user. In one embodiment, write permissions is enforced via User Groups and permissions. If needed, a user can use HGM 400 (via interface 500) to add a new member (e.g., a MIO Source organization) to a hierarchy set. As an example, to add a member, select Tools and then select Add Member from a dropdown menu. This selection process creates a new MIO record in Hierarchy Tree Pane 533 and the user can then use Attribute History tab to add new attributes just like adding a new attribute to an existing MIO record.

Figure 11:
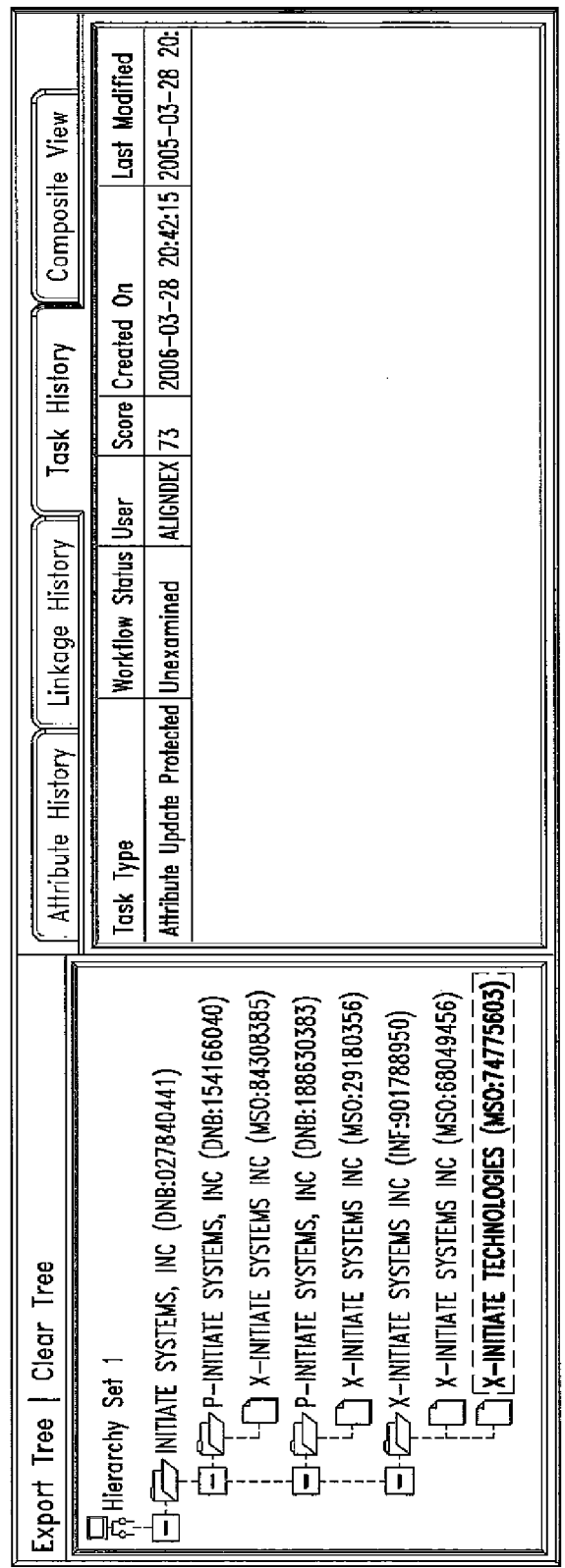

Depending on the attribute chosen, Edit Attribute window 544b may contain all the available data elements for that segment or group (e.g., employees, sales, etc.). In one embodiment, if any element of that segment is changed, the entire attribute is versioned. In addition to changing attribute values, in one embodiment, a user can Inactivate, Delete, or Re-Activate attribute values by right-clicking on the attribute value and setting the appropriate status. As a specific example, editable attributes in Orgempl, Orgindus, and Orgsales segments contain Protect Flag elements. Thus, if a user sets this flag to Yes (Y), then the attribute value listed will not be overwritten by any changes that come through delta processing. Instead, if a delta change threatens to overwrite a Protected attribute value, delta creates a task. When the delta process determines that a Protected attribute has received an update, it creates an "Attribute Update Protected" task for users to review before deciding whether or not to make the change manually. FIG. 11 shows a screenshot of exemplary Task History 544c which allows a user to view existing tasks, including data change review tasks. A visual queue (e.g., a red letter "T") may be associated with a link to a record to indicate to the user that the record has unresolved task(s) that needs the user's attention.

To work on the tasks, a user may select to display the node side-by-side, an example of which is provided in Table 2.

TABLE 2

| | Enterprise ID | | |
|---|---|---|---|
| | 543 | 543 | 543 |
| | | Source: Source ID | |
| | MIOUS: 543 | DNBUS: 8766 | MSOUS: 77832 |
| Member Task | | | |
| Entity Task | | X | |
| Org Name | Initiate Systems | Initiate Systems | Initiate |
| Trade Name | Initiate Systems | Initiate Systems | Initiate |
| Mailing Address | PO Box 10 Phoenix AZ | | PO Box 10 Phoenix AZ |
| Physical Address | 200 Main St Phoenix AZ | 200 Main St Phoenix AZ | |
| Phone | 555-4563 | 555-4563 | 555-4563 |
| SIC (1) | 1453 | 1498 | |

Table 2 shows the MIO record (MIOUS:543) along side each of the source candidate records (DNBUS:8766 and MSOUS:77832) at that node (543). The most current, active attribute value is shown for each attribute. Thus, the user can see which MIO Protected Attribute has a new value on the Source record that generated the task. The user can then decide whether or not to overwrite the existing protected MIO value with the value listed on the candidate that was updated during Delta processing (in this case, replacing SIC 1453 with 1498). If the user does not wish to overwrite the value, the user can simply use the available dropdown on the task status field in Task History tab 544*c* and change it to Resolved. If the user wants the change to take effect, the user can use the Node Display tab to manually update the value on the MIO record to match the value that was updated by the delta. The user can then change the task status to Resolved.

When external sources indicate that a member (an organization) is deleted, users can see "Member Deleted" tasks that allow them to decide whether to honor the delete instructions from a third party source or keep the organization active (e.g., within MIO 450). As an example, a user may note that one candidate at the node has a deleted status. A decision must be made as to whether or not to change the associated MIO member status to Deleted. In one embodiment, to change the member status, the user must first remove any descendents (children) through unparenting or reparenting activity as a MIO organization with children cannot be deleted. This process may be referred to as performing a sanity check. Then, the user can right-click on the member in the hierarchy and select Delete to logically delete it. After making the change (or not making it), the user can change the task status to Resolved as described above.

In some embodiments, if a MIO record has either an "Attribute Update Protected" task or a "Delete Review" task associated with it, the Tree display may indicate that task with an icon or some kind of a visual queue.

Some embodiments of HGM 400 include an Organization Export feature that allows an end user to export either an organization (i.e., a node or a member of a hierarchy) or an entire organizational tree from Hierarchy Tree Pane 533 to a comma separated values file that can be subsequently opened with a spreadsheet application (e.g., Microsoft® Excel). In one embodiment, a user can invoke the Export function by clicking on Export Tree button or icon in Hierarchy Tree Pane 533 or using a right mouse click. In response, a window (not shown) may appear with clickable icons that allow the user to select either to export a node or tree to a file. Once the user selects what she wishes to export (node or tree), the user is asked for a location to save the file and the name for the file. In one embodiment, HGM 400 includes a mechanism to establish a default location (e.g., desktop) and generate an appropriate file name to ensure uniqueness and easy identification. In some embodiments, the list and order of attributes and fields to export can be fixed. In some embodiments, a few fields do not follow traditional compositing rules. For example, a "˜" delimited listing of the MSO_ID's may be included for each node. This applies to both node export and tree export. Additionally, in some embodiments, when exporting a Tree, two additional fields, Parent and Root, are provided. Parent field contains the identifier of the node's parent. Root field contains the identifier of the node's root. In some embodiments, the Organization Export function follows the same user/group security rules that govern Hierarchy Tree Pane 533. That is, if data cannot be displayed in Hierarchy Tree Pane 533, it cannot be exported.

Hierarchy Management

Embodiments of interface 500 include drag and drop capabilities, which can be used in Hierarchy Tree Pane 533 to manage both Parenting and Identity relationships. A user can move any type of record, but the user can only move records to MIO Source records (including MIO and MNG sources). The relationship change made by HGM 400 depends on the type of source record moved. More specifically, when a user moves a MIO source record (MIO or MNG), the user is managing the MIO source record's parenting relationship. When a user moves a non-MIO Source record (e.g., DUNS, INFO, SOG, etc.), the user is managing the record's identity relationship.

Reparenting—Changing Parenting Relationships

To change an organization's parent relationship, a user can move the MIO Source record that anchors that node. When a parenting change is made, embodiments of HGM 400 can automatically move the entire node and all of that node's children organizations. In some cases, a user can use reparenting to break-out a MIO Node and its children into a new hierarchy. To do this, the user can drag the MIO record and drop it onto the hierarchy set icon (e.g., Hierarchy Set 1 as shown in FIG. 11). This action sets the MIO node as the Root member in a new tree.

Relinking—Changing Identity Relationships

To change an organization's identity relationship, a user can simply drag and drop the candidate record (not a MIO Source record) onto the MIO Source record where it belongs. The underlying function of HGM then operates to move the candidate record to the specified node. That candidate record is then listed beneath the MIO Node.

In some embodiments, the Relinking functionality can be used to create a new MIO record based on a non-MIO record. For example, a user may have an MSO record that is part of an existing MIO node. However, the user knows that the MSO record represents a different business unit, and that business unit does not exist elsewhere in MIO 450. The user can drag the MSO record out of its current node and drop it onto the Set Hierarchy icon. In response, HGM 400 operates to move the MSO record out of its node and link it to a new MIO Source record that HGM 400 has automatically created based on the MSO record attributes.

Merges

There may be some scenarios where a user wants to merge two MIO Source records into a single node. To do this, the following process may be employed:

Decide which MIO record will become obsolete after the merge, and which will be the surviving MIO record;

If that record is a parent, move all children MIO records to the surviving parent;

Move all non-MIO records that have identity relationships with the obsolete record to the survivor; and Logically delete the remaining MIO record by right clicking on the tree and selecting Delete. Note that MIO records can only be deleted if they have no records linked to them. A sanity check may be performed to avoid deleting a node that has at least one direct descendent.

Linkage Review

Linkage Review tasks are created during Delta Processing and include the following:

Soft Link Single Node

Soft Link Single Tree

Soft Link Multi Tree

Hard Link Single Tree

Hard Link Multi Tree

The Linkage Details tab displays these tasks similarly to the Data Change tasks. To work a Linkage Review Task, a user may need to evaluate whether the organization of interest is located in the correct hierarchy and whether it is at the correct node in the hierarchy. The user can evaluate that by using Hierarchy Tree Pane 533 to navigate between organizations, examine the pertinent attributes associated therewith via Organization Details Pane 544, and determine the best location for the organization of interest.

Figure 12:
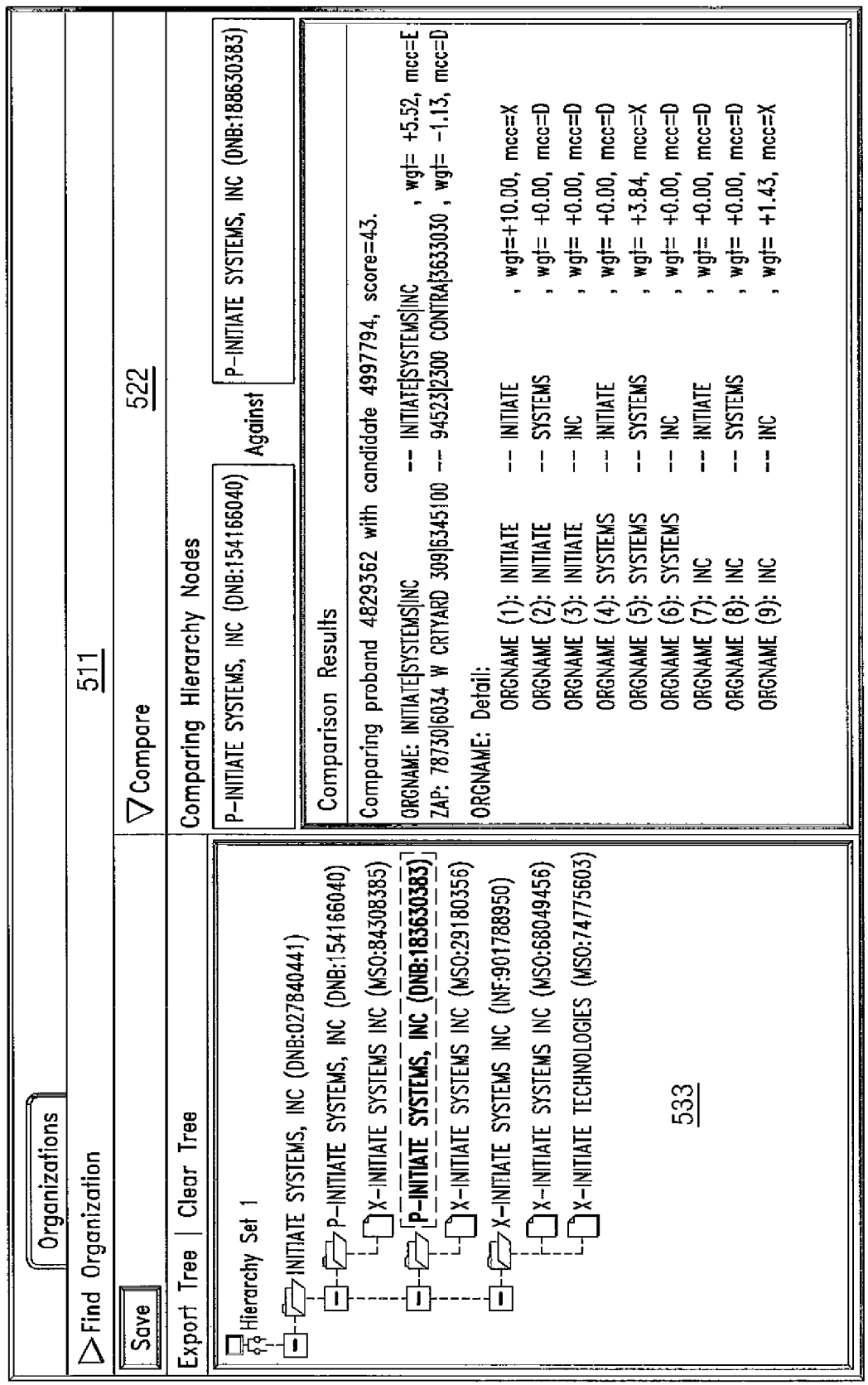

In addition, the user may choose to use the Compare function via Compare Pane 522 to directly compare two organization records and determine if they should be at the same node. To do this, the user may open Compare Pane 522 by clicking on the Compare icon as shown in FIG. 12.

To perform a compare, the user may drag an organization candidate record from the tree and drop it on one of the "Compare Hierarchy Nodes" boxes in the Compare Pane. When a second organization candidate record is dropped into the other box, HGM 400 may operate to compare these candidate records and display the results as shown in FIG. 12. If the user wants to compare a different record, the user may simply drag a new organization and drop into one of the boxes to overwrite the existing organization. HGM 400 may operate to immediately perform a new comparison, making it easy to quickly compare an organization with multiple nodes.

If the user decides to move an organization, the user may follow the relinking process described above. If the user decides that the existing linkage was correct, the user may simply change the linkage status to Reviewed-OK to indicate that the linkage is correct. In summary, to resolve a Linkage Review Task, the user may take one of the following actions:
  Move the record to a different MIO Source; or
  Change the Linkage status to "Examined-OK" or "Reviewed-OK".

Reparent Task Review

Reparent tasks indicate that the Delta process received an update to a Non-MIO record that implied a change to the node's parent. Hierarchy tasks may correspondingly appear in Task History tab 544*c*. If a record has a Reparent task, the user may examine the node and determine whether it should be reparented. If it should, the user may simply perform that action as described above. If the node is in the correct location, the user may change the Task Status to Resolved to indicate that the issue has been examined and no action was required. This removes the task.

Task Summary

Several different types of tasks are described above, two types of which can be searched for and through different panes (screens). One type is Linkage Review Tasks. When records are originally added to MIO 450 they are automatically matched with varying degrees of confidence. The Linkage Review function may be utilized to validate these matches and change them when necessary. Another type is Data Change Tasks. The Data Changes Tasks function indicates to a user that a candidate record is changed and the user should review the change(s) to determine whether the change(s) should have an impact on the MIO source. The following tables provide a summary of all task types and describe the information provided to help resolve each particular task type.

TABLE 3

| Linkage Review Type | Applies to | Relative Severity | Resolution Tips |
| --- | --- | --- | --- |
| SoftLink MTree | Non-MIO entity* | High | With the record's current tree loaded, perform a 'Match' to load the next best matching tree and see which fits best. |
| SoftLink STree | Non-MIO entity* | Medium | Determine which node in the loaded tree is the best match. |
| SoftLink SNode | Non-MIO entity* | Medium | Decide whether the existing node is a valid match |
| HardLink MTree | Non-MIO entity* | Medium | With the record's current tree loaded, perform a 'Match' to load the next best matching tree and see which fits best. |
| HardLink STree | Non-MIO entity* | Low | Determine which node in the loaded tree is the best match. |

*By definition, a member can have only one Linkage Review Type at a time and this is assigned only when the member is originally added and matched to MIO.

TABLE 4

| Data Change Task Type | Applies to | Relative Severity | Resolution Tips |
| --- | --- | --- | --- |
| Member Delete | MIO member | Medium | Decide whether the whole MIO node should be deleted along with that candidate. |
| Potential Linkage | Non-MIO entity | Medium | With the record's current tree loaded, perform a 'Match' to load the next best matching tree and see which fits best (use the same method as MTree). |
| Potential Overlay | Non-MIO member* | High | Use Attribute Details to see if the new values actually represent that Organization (if not, the Source Id on the delta file was incorrect). |
| Potential Reparent | Non-MIO member* | Medium | Perform a Find using the new Parent Id suggested on the Candidate. See if that Node is a better parent than the existing Node. |

TABLE 4-continued

| Data Change Task Type | Applies to | Relative Severity | Resolution Tips |
| --- | --- | --- | --- |
| Attribute Update Protected | Non-MIO member* | Low | Use the side-by-side Node view to find attribute(s) on the Candidate record that changed and decide whether to manually make the change(s) to the Protected MIO Attribute(s). |

*A non-MIO member can have only one of these 3 task types at a given time. They are listed in order of precedence above. In one embodiment, overlay is assigned as an overriding task type. Thus, in this example, if a member has a Potential Reparent task and then another update comes in that results in an overlay scenario, the Potential Reparent task is replaced with the more severe Potential Overlay task. However, as one skilled in the art can appreciate, other task types may be generated by a processor which does not employ task precedence.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope of the invention as detailed in the following claims.

What is claimed is:

1. A hierarchy global management system comprising:
a set of user computers;
a server computer coupled to the set of user computers over a network, comprising:
  a processor; and
  one or more computer readable media accessible by said processor and storing computer instructions executable by said processor to implement a hierarchy global manager (HGM) with a user interface for display at any one of the set of user computers having a plurality of functions for managing indexed master records, wherein said computer instructions comprise:
code for searching an organization in a hierarchy based on one or more search criteria received from a user at a user computer over the network;
code for returning a set of records, each of which matches said one or more search criteria to a degree of confidence, wherein said set of records represent one or more members of said hierarchy, including said organization, each of the at least one of the members having a hierarchical association to at least one other member such that the records corresponding to any one member have the same hierarchical relationship to the records corresponding to the other member and where at least one member comprises a first record and a second record and the first record was associated with the second record by:
identifying a set of candidate records based on a comparison between a set of existing records and the first record, wherein the set of candidate records comprises the second record;
scoring each of the set of candidate records, wherein the score of each of the candidate records corresponds to a likelihood that the first record and the candidate record comprise information on the same member;
determining that the score of the second record is greater than a first threshold, wherein the second record is in the hierarchy such that the second record has a first set of hierarchical associations with a first set of related records, and
associating the first record with the second record such that the first record has the first set of hierarchical associations with the first set of related records;
code for loading said hierarchy or a portion thereof into a workspace of said user interface;
code for providing a user at a user computer the ability for navigating among loaded members within said hierarchy; and
code for providing a user at a user computer the ability for making relationship changes to said loaded members of said hierarchy.

2. The hierarchy global management system of claim 1, wherein each member of said hierarchy is a node having a master record of said member and zero to any number of candidate records that are linked to said member.

3. The hierarchy global management system of claim 2, wherein said computer instructions further comprise code for enabling a user to add and edit attribute values of said master record.

4. The hierarchy global management system of claim 3, wherein said computer instructions further comprise code for versioning said master record.

5. The hierarchy global management system of claim 1, wherein said computer instructions further comprise code for enabling a user to move said loaded members within said hierarchy.

6. The hierarchy global management system of claim 1, wherein said computer instructions further comprise code for enabling a user to move said loaded members across hierarchies residing in said hierarchy global management system.

7. The hierarchy global management system of claim 1, wherein said computer instructions further comprise code for enabling a user to break said organization out from said hierarchy into a separate hierarchy.

8. The hierarchy global management system of claim 1, wherein said computer instructions further comprise code for enabling a user to compare records to determine their degree of similarity, and whether they belong to same member or in the same hierarchy.

9. The hierarchy global management system of claim 1, wherein said computer instructions further comprise code for enabling a user to add, update, or delete a member.

10. The hierarchy global management system of claim 9, wherein said computer instructions further comprise code for presenting to a user an instruction from a third party source to delete a member of said hierarchy.

11. The hierarchy global management system of claim 9, wherein said computer instructions further comprise code for enabling a user to change parenting and identity relationships of said member.

12. The hierarchy global management system of claim 1, wherein said computer instructions further comprise:
   code for searching organizations whose demographics meet said one or more search criteria;
   code for searching organizations having a specific linkage task associated therewith; and
   code for searching organizations having a specific data management task associated therewith.

13. The hierarchy global management system of claim 1, wherein said computer instructions further comprise code for enabling a user to export a consolidated view of said hierarchy or a portion thereof to a delimited file.

14. The hierarchy global management system of claim 1, wherein said computer instructions further comprise code for displaying linkage details between members of said hierarchy, wherein said linkage details include match scores, wherein a soft linkage represents a lower score match, and wherein a hard linkage represents a higher score match.

15. The hierarchy global management system of claim 1, wherein said computer instructions further comprise code for presenting a change in an attribute value of a master record of a member of said hierarchy.

16. The hierarchy global management system of claim 1, wherein said computer instructions further comprise code for automatically processing said change and updating said master record.

17. A computer readable storage medium carrying computer executable instructions implementing a hierarchy global manager (HGM) with a user interface in a system having a set of client computers coupled to a server computer over a network, the user interface having a plurality of functional areas for managing indexed master records, wherein said plurality of functional areas comprise:
   a Find Organization functional area for enabling a user to search by Organization, by Linkage, or by Task, wherein the Find Organization functional area is presented by the hierarchy global manger to a user at one of the set of client computers;
   a Search Results functional area for displaying a set of records representing one or more members of a hierarchy that match, to a degree of confidence, one or more search criteria specified by said user, wherein the Search Results functional area is presented by the hierarchy global manger to a user at one of the set of client computers;
   a Compare functional area for enabling said user to compare records to determine whether they belong to same member, wherein the Compare functional area is presented by the hierarchy global manger to a user at one of the set of client computers;
   a Hierarchy Tree functional area for displaying said hierarchy or a portion thereof and enabling said user to navigate among members of said hierarchy, wherein the Hierarchy Tree functional area is presented by the hierarchy global manger to a user at one of the set of client computers; and
   an Organization Details functional area presented by the hierarchy global manger to a user at one of the set of client computers for enabling said user to view and edit attributes, linkages, and tasks associated with a member of said hierarchy, wherein each member of said hierarchy is a composite node having at least two candidate records that are linked together and wherein one of said at least two candidate records is a master record of said member, each of the at least one of the members having a hierarchical association to at least one other member such that the data records corresponding to any one member have the same hierarchical relationship to the data records corresponding to the other member and where at least one member comprises a first candidate data record and a second candidate data record and the first candidate data record was associated with the second candidate data record by;
   identifying a set of candidate records based on a comparison between a set of existing records and the first candidate data record, wherein the set of candidate records comprises the second candidate record;
   scoring each of the set of candidate records, wherein the score of each of the candidate records corresponds to a likelihood that the first candidate record and the second candidate record comprise information on the same member;
   determining that the score of the second candidate data record is greater than a first threshold, wherein the second candidate record is in the hierarchy such that the second candidate data record has a first set of hierarchical associations with a first set of related records, and
   associating the first candidate record with the second candidate record such that the first candidate record has the first set of hierarchical associations with the first set of related records.

18. A system comprising:
   a set of user computers;
   a server computer coupled to the set of user computers over a network, comprising:
   a processor; and
   one or more computer readable media accessible by said processor and storing computer instructions executable by said processor to implement a hierarchy global manager (HGM) with a user interface having a plurality of functional areas for managing indexed master records, wherein said plurality of functional areas comprise:
   a Find Organization functional area for enabling a user to search by Organization, by Linkage, or by Task, wherein the Find Organization functional area is presented by the hierarchy global manger to a user at one of the set of client computers;
   a Search Results functional area for displaying a set of records representing one or more members of a hierarchy that match, to a degree of confidence, one or more search criteria specified by said user, wherein the Search Results functional area is presented by the hierarchy global manger to a user at one of the set of client computers;
   a Compare functional area for enabling said user to compare records to determine whether they belong to same member, wherein the Compare functional area is presented by the hierarchy global manger to a user at one of the set of client computers;
   a Hierarchy Tree functional area for displaying said hierarchy or a portion thereof and enabling said user to navigate among members of said hierarchy, wherein the Hierarchy Tree functional area is presented by the hierarchy global manger to a user at one of the set of client computers; and
   an Organization Details functional area presented by the hierarchy global manger to a user at one of the set of client computers for enabling said user to view and edit attributes, linkages, and tasks associated with a member of said hierarchy, wherein each member of said hierarchy is a composite node having at least two candidate records that are linked together and wherein one of said at least two candidate records is a master record of said member, each of the at least one of the members having a hierarchical association to at least one other member such that the data records corresponding to any one member have the same hierarchical relationship to the data records corresponding to the other member and where at least one member comprises a first candidate data record and a second candidate data record and the first candidate data record was associated with the second candidate data record by:

identifying a set of candidate records based on a comparison between a set of existing records and the first candidate data record, wherein the set of candidate records comprises the second candidate record;

scoring each of the set of candidate records, wherein the score of each of the candidate records corresponds to a likelihood that the first candidate record and the second candidate record comprise information on the same member;

determining that the score of the second candidate data record is greater than a first threshold, wherein the second candidate record is in the hierarchy such that the second candidate data record has a first set of hierarchical associations with a first set of related records, and associating the first candidate record with the second candidate record such that the first candidate record has the first set of hierarchical associations with the first set of related records.

19. The system of claim 18, wherein each member of said hierarchy is a node having a master record of said member and zero to any number of candidate records that are linked to said member and wherein a node is declared composite when at least two candidate records are linked together.

20. The system of claim 19, wherein said computer instructions further comprise code for enabling a user to add, edit, or delete said master record.

* * * * *